July 30, 1957　　J. F. O'BRIEN ET AL　　2,800,775
FREEZING DEVICE
Filed March 8, 1955　　2 Sheets-Sheet 1

INVENTOR.
John F. O'Brien,
BY Arthur J. Frei, and
Harry O. Waag
THEIR ATTORNEY

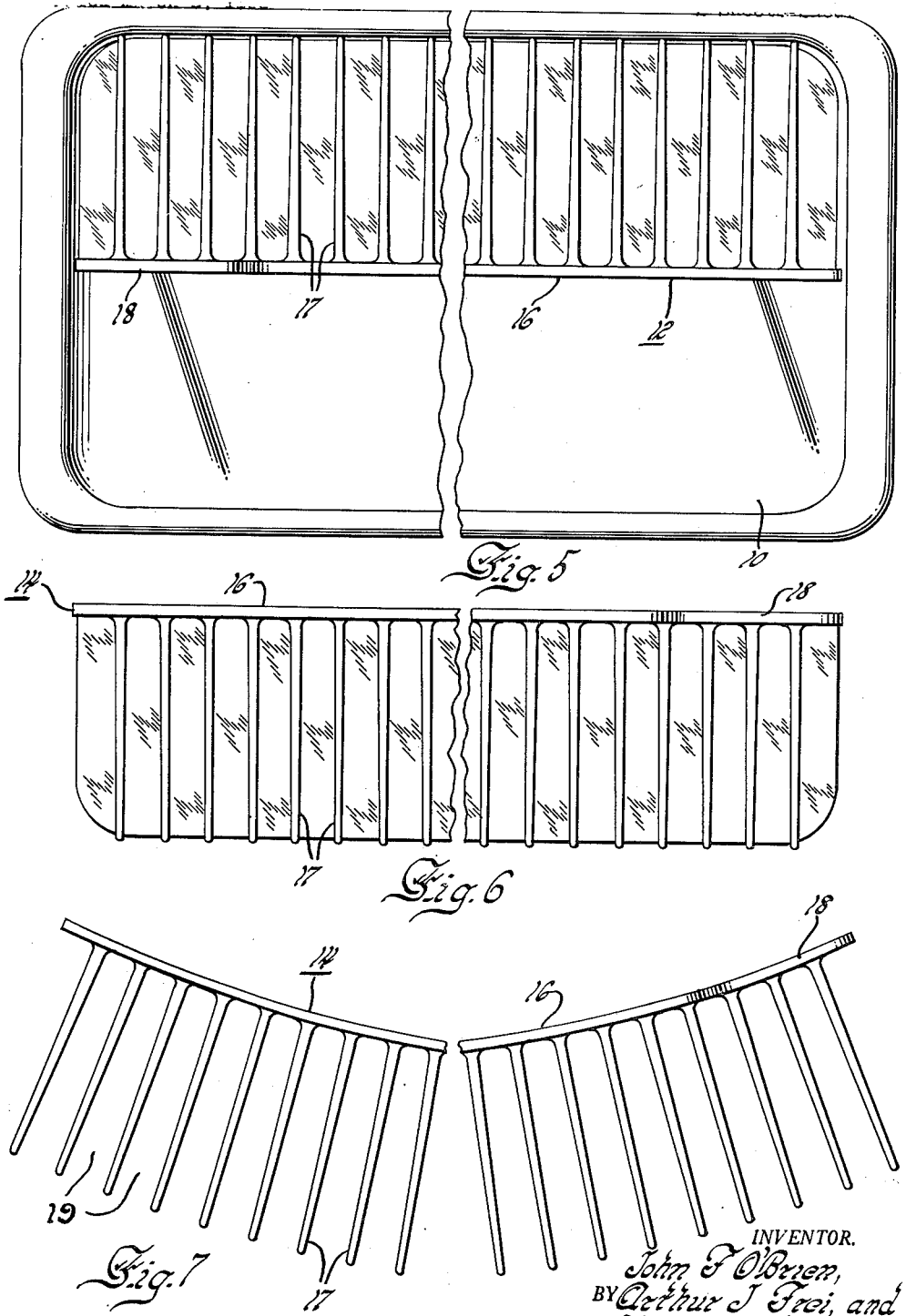

United States Patent Office 2,800,775
Patented July 30, 1957

2,800,775

FREEZING DEVICE

John F. O'Brien, Arthur J. Frei, and Harry O. Waag, Dayton, Ohio, assignors to General Motors Corporation, Detroit, Mich., a corporation of Delaware Application March 8, 1955, Serial No. 492,846

1 Claim. (Cl. 62—108.5)

This invention relates to freezing devices, particularly of the tray and grid type.

An object of the invention is to provide an improved freezing device for household refrigerators which can be easily and cheaply manufactured, which is rugged and durable in use and in which a novel method of harvesting ice blocks therefrom for table use in chilling drinks in glasses is obtained.

Another object of the invention is to provide a freezing device of the tray and grid type which will mold or produce substantially flat elongated ice slivers or wafer-like ice blocks for cooling drinks in glasses more rapidly than has been accomplished by prior conventional ice cubes.

A further object of the invention is to provide a tray of a freezing device with a removable grid comprising two identical unattached resilient units each including an upright longitudinal wall and a plurality of integral, spaced apart, upright walls extending from one side only of the longitudinal wall whereby the units can be reversely turned when placed in the tray with the longitudinal wall thereof abutting one another to form the sole means of dividing the entire interior of the tray into side by side rows of wafer-like ice block compartments.

In carrying out the foregoing objects, it is a still further and more important object of the invention to provide a freezing device wherein a grid, removably disposed in a distortable metal tray thereof, comprises or includes two unattached resilient grid units one of which, together with ice blocks adhering thereto, is removable from the tray upon distorting or twisting of the same without disturbing the other grid unit in the tray for harvesting a few or less than all ice blocks therefrom while leaving ice blocks adhering to walls of the other grid unit in the tray whereby ice blocks remaining in the tray may be prevented from melting by reinserting the tray into a freezing compartment until these remaining ice blocks are to be harvested.

Further objects and advantages of the present invention will be apparent from the following description, reference being had to the accompanying drawings, wherein a preferred form of the present invention is clearly shown.

In the drawings:

Figure 5 is a broken top view of the freezing device similar to Figure 1 with ice formed therein and showing one of the units of a grid in the tray thereof removed from the tray;

Figure 6 is a broken top view of the grid unit removed from the tray with ice wafers adhering to walls thereof; and Figure 7 is a view showing the removed grid unit flexed or bowed with ice wafers released from its walls.

In freezing devices for household refrigerators, it has heretofore been the practice to move a part or walls of a grid in a tray thereof relative to one another for releasing ice blocks from the tray and from the grid. In such devices all of the ice blocks have been simultaneously removed from the tray regardless of the number of ice blocks required for immediate use. It was difficult, if not impossible, to place unused ice blocks back into the grid and the grid into the tray whereby the device could be reinserted into a freezing compartment to hold the unused ice blocks in a hard-frozen state until they were desired to be harvested. Due to this difficulty, a housewife would become embarrassed and disgusted and would usually throw the extra or unused released ice blocks in the sink and refill the freezing device with water to be frozen. Obviously such practice resulted in much waste and placed additional unnecessary demands on the refrigerating system associated with the refrigerator which had to be paid for by the user thereof. The present invention is intended to overcome the practice just described as well as to eliminate other difficulties encountered in removing ice blocks from prior freezing devices while at the same time produce slivers of ice or wafer-like ice blocks.

Figure 1:
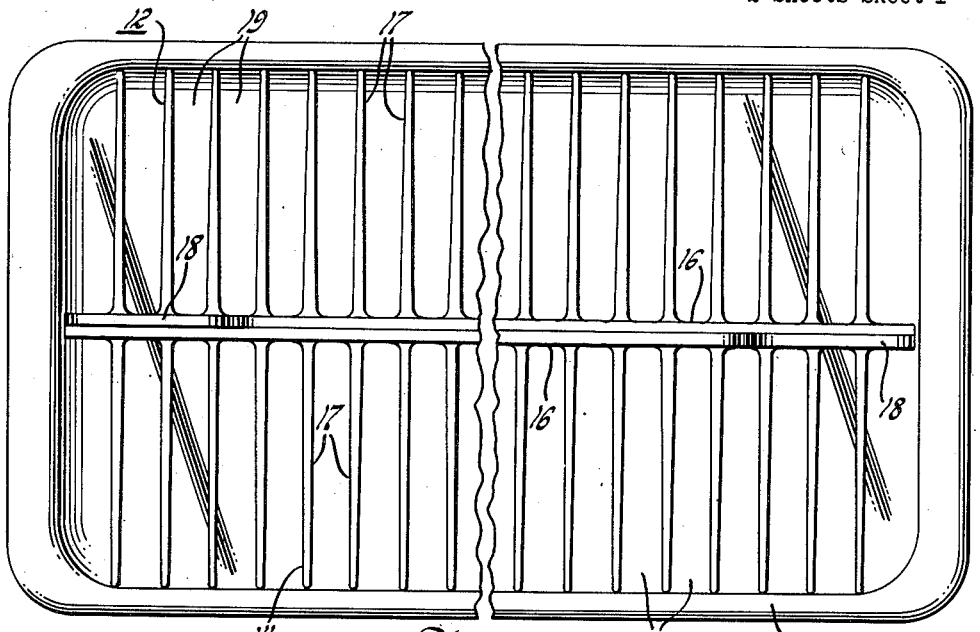
Figure 1 is a broken top plan view of a freezing device having the present invention embodied therein.
Figure 2:
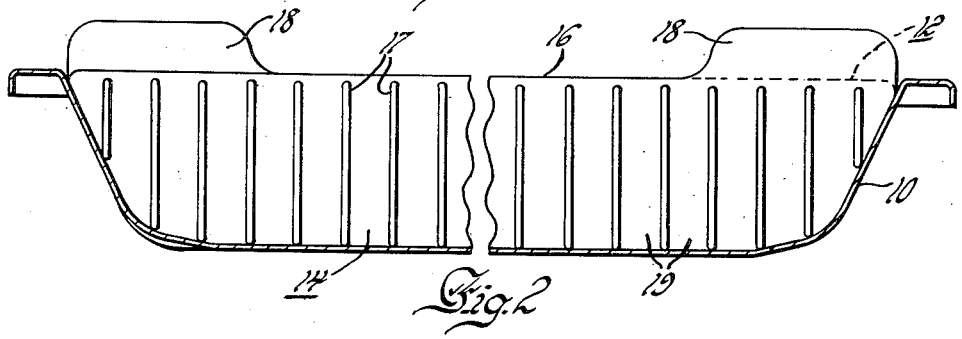
Figure 2 is a broken side view of the freezing device disclosed in Figure 1 showing the tray thereof in section.
Figure 3:
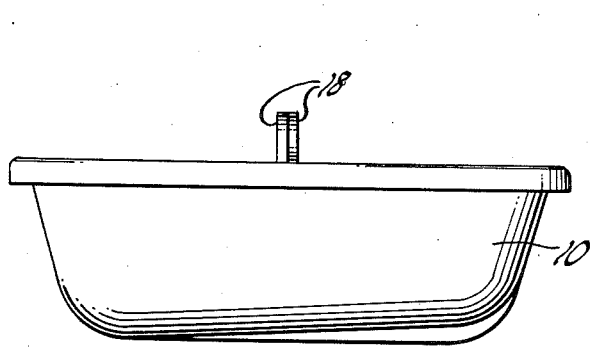
Figure 3 is an end view of the freezing device shown in Figure 1.
Figure 4:
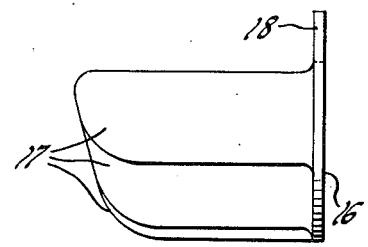
Figure 4 is an end view of one of the grid units employed in the tray of the freezing device.

Referring now to the drawings, there is shown in Figure 1 thereof, a freezing device including an elongated pan or tray generally represented by the reference numeral 10 and preferably punched or stamped from sheet metal. Tray 10 is distortable and is of the character which may be flexed to break a bond between ice therein and walls thereof by supporting same on a flat table top or the like and applying pressure to the top of its ends. Such a tray is fully illustrated and specifically described in the patent to Harvey D. Geyer, No. 2,122,937 issued July 5, 1938, entitled, "Freezing Tray" and assigned to the assignee of the present application. This tray is provided with means for facilitating flexing thereof in the manner described and is now well and commonly known to the trade as a "Presto" pan or tray. A grid separate from and removably disposed in tray 10 includes or comprises two unattached pieces or units, 12 and 14, walls of which cooperate with walls of the tray to form the sole means of dividing the entire interior of the tray into ice block cells or compartments. Each of the grid units 12 and 14 are preferably formed of flexible and resilient elastomers in a single mold so as to be identical in all respects and are reversely turned relative to one another when placed in tray 10. Each unit 12 and 14 includes a vertical or upright longitudinal wall 16 and a plurality of spaced apart vertical or upright walls 17 formed integrally therewith and extending laterally from one side only of the wall 16. The sides of each wall 17 may, if desired, be tapered toward one another in their extension from wall 16 to their outer end. Some of the laterally extending walls 17 at the ends of grid units 12 and 14 are shorter than others thereof (see Figures 2 and 4) so that they will conform to the inclination of end walls of tray 10. The walls 17 of grid units 12 and 14 are so spaced apart along the length of wall 16 as to form compartments of thin wafer-like thickness. Longitudinal wall 16 of each grid unit 12 and 14 is provided with an upstanding tab 18 (see Figures 2 and 3) for a purpose to be hereinafter described. The grid units 12 and 14 may be molded from polyethylene, plasticized vinyls or polytetrafluoroethylene, now well known to those skilled in the art and commonly known to the public under various trade names, and/or they may be formed of any suitable rubber-like materials having natural rubber or synthetic rubber as a base. In all cases, the material must be compounded or processed to be rugged and sufficiently flexible for its intended use.

When it is desired to freeze water into ice pieces or wafer-like blocks, the grid units 12 and 14 are placed in tray 10 by reversing or rotating one of them so that the upright longitudinal wall 16 thereof abuts against the wall 16 of the other. Both walls 16 and walls 17 of each grid unit cooperate with walls of tray 10 to form the open top wafer-like compartments 19 in the freezing device. The freezing device is now substantially filled with water up to a level slightly below the top of walls 17 and the device is inserted in a freezing compartment of a refrigerator cabinet until the water is hard-frozen into slivers or wafer-like blocks in the compartments 19. Thereafter, the freezing device may be removed from the freezing compartment to harvest ice blocks therefrom. The device is placed on a flat surface such as that of a work ledge or table top and a downward pressure is applied to diagonally opposed corners at the ends of tray 10 of the device. This pressure twists and flexes tray 10 and in addition to shifting the grid units 12 and 14 therein relative to one another, to loosen adhesion between the longitudinal walls 16 thereof, also breaks the bond between walls of the tray and all the ice blocks therein. During flexing of tray 10 as explained and as more fully and specifically described in the Geyer patent hereinbefore referred to ice blocks remain adhered to walls 16 and 17 of the grid units 12 and 14. In order to now harvest the wafer-like ice blocks from the freezing device, tab 18 on one of the grid units 12 or 14 is grasped by the fingers and the desired grid unit, together with ice blocks adhering thereto, is elevated out of tray 10 (see Figures 5 and 6). As many ice wafers as are now desired to be used may be readily pushed downwardly relative to walls 17 and away from wall 16 by the fingers out of the removed grid unit shown in Figure 6 of the drawing. The taper of walls 17 facilitate this ice wafer removal operation. If less than all of the ice wafers are released from the removed grid unit, those remaining adhered thereto may be returned to tray 10 by replacing the removed grid unit thereinto. The ice wafers in the grid unit are permitted to remain in tray 10 and those replaced therein by reinserting the removed grid unit may be held in a hard-frozen condition by replacing the tray into the freezing compartment of the refrigerator. However, if all the ice wafers are desired to be released from the removed grid unit in one operation, its resilient longitudinal wall 16 may be flexed, by bowing same as disclosed in Figure 7 of the drawings, whereupon the integral laterally extending walls 17 will spread apart or move away from one another and away from the ice wafers to free the wafers therefrom. The freed ice wafers fall out of the bowed grid unit and may be caught in any suitable receptacle for serving them at a table. The ice blocks or wafers adhering to the other grid unit remaining in tray 10 may also be harvested as described or they may be returned along with the tray to the freezing compartment of the refrigerator for holding them in a hard-frozen condition.

It will be noted that all or less than all ice slivers, wafers, or blocks in a tray and grid of a freezing device of the present invention may be harvested as desired. Either grid unit in the ice tray may be removed therefrom independently of removing the other grid unit whereby this other unit together with ice blocks therein may be returned to the freezing compartment in the tray and stored therein until the demand for using more ice blocks occurs. By providing for the release of less than all ice blocks from the present freezing device the invention eliminates the necessity of wasting ice blocks by throwing unused blocks in the sink where they melt away.

While the form of embodiment of the invention as herein disclosed constitutes a preferred form, it is to be understood that other forms might be adopted, as may come within the scope of the claim which follows.

What is claimed is as follows:

In combination with an elongated metal tray capable of being twisted from end to end along a longitudinal axis by force applied to diagonally opposed corners thereof while ice is frozen therein, two separate identical resilient molded plastic partitioning units disposed in said tray and independently removable therefrom, said units dividing the interior of said tray into rows of narrow compartments in which water is to be frozen into separated pieces of ice, each of said partitioning units comprising an upright wall extending continuously in a straight line plane longitudinally of the tray, a plurality of spaced apart wing-like walls formed integral with and extending laterally from one side of said longitudinal wall and a single tab formed integrally on said longitudinal wall projecting thereabove at one end thereof, the ends of said tray being inclined outwardly from its bottom to its top and said partitioning units having additional integral walls at their ends subdividing the inclined end portions of said tray into compartments, said units being unattached and reversely turned in said tray to position said longitudinal walls in back to back contiguous relationship to one another and to locate one of said tabs at opposite ends of the tray, said unattachment of said units causing the contiguous longitudinal walls thereof to be shifted relative to one another upon twisting said tray along its length for breaking bonds between same and ice pieces therein, the tab on one of said units serving, after the tray has been twisted, as a finger grip for sliding the longitudinal wall of said one unit upwardly along the contiguous surface of the longitudinal wall of the other of said units out of said tray without moving walls of said other unit, and the ice pieces freed from said tray in the compartments of the row formed by said one partitioning unit remaining bonded to its walls whereby they are moved out of the tray therewith.

References Cited in the file of this patent

UNITED STATES PATENTS

| 2,037,517 | Saler | Apr. 14, 1936 |
| 2,168,678 | Miner | Aug. 8, 1939 |
| 2,188,781 | Steenstrup | Jan. 30, 1940 |
| 2,193,694 | Miner | Mar. 12, 1940 |
| 2,221,810 | Miner | Nov. 19, 1940 |
| 2,251,461 | Miner | Aug. 5, 1941 |
| 2,285,605 | Miner | June 9, 1942 |
| 2,323,486 | Pizarro | July 6, 1943 |
| 2,367,573 | Gibson | Jan. 16, 1945 |
| 2,372,483 | Geyer | Mar. 27, 1945 |
| 2,596,021 | Gaugler | May 6, 1952 |
| 2,683,358 | Hallock | July 13, 1954 |
| 2,688,236 | Copeman | Sept. 7, 1954 |
| 2,702,991 | Foster | Mar. 1, 1955 |
| 2,720,760 | Nigro | Oct. 18, 1955 |